(12) United States Patent
Jeong

(10) Patent No.: US 10,531,054 B2
(45) Date of Patent: *Jan. 7, 2020

(54) DISPLAY DEVICE

(71) Applicant: SAMSUNG DISPLAY CO., LTD., Yongin-si, Gyeonggi-do (KR)

(72) Inventor: Seungheui Jeong, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/105,927

(22) Filed: Aug. 20, 2018

(65) Prior Publication Data

US 2018/0359454 A1 Dec. 13, 2018

Related U.S. Application Data

(63) Continuation of application No. 14/975,081, filed on Dec. 18, 2015, now Pat. No. 10,057,550.

(30) Foreign Application Priority Data

Apr. 6, 2015 (KR) .......................... 10-2015-0048385

(51) Int. Cl.
*G06F 1/16* (2006.01)
*H04N 9/30* (2006.01)
*G09G 3/00* (2006.01)
*G09F 9/30* (2006.01)

(52) U.S. Cl.
CPC ................. *H04N 9/30* (2013.01); *G06F 1/16* (2013.01); *G06F 1/1601* (2013.01); *G06F 1/1643* (2013.01); *G06F 1/1652* (2013.01); *G09F 9/301* (2013.01); *G09G 3/00* (2013.01)

(58) Field of Classification Search
CPC ........... G02F 1/133305; G02F 1/13452; G06F 1/1652; G09F 9/301
See application file for complete search history.

(56) References Cited

U.S. PATENT DOCUMENTS 6,532,152 B1 * 3/2003 White ............... G02F 1/133308
312/223.1
6,815,070 B1 * 11/2004 Burkle ...................... B32B 3/04
427/165
7,595,983 B2 * 9/2009 Okuda ............... G02F 1/133308
313/582
8,890,824 B2 * 11/2014 Guard ...................... G06F 3/044
345/173

(Continued)

FOREIGN PATENT DOCUMENTS

KR 10-2014-0099005 A 8/2014
KR 10-2014-0108826 A 9/2014

(Continued)

*Primary Examiner* — Adrian S Wilson
(74) *Attorney, Agent, or Firm* — Lewis Roca Rothgerber Christie LLP

(57) ABSTRACT

A display device includes: a display panel having a first curved portion and a second curved portion; a window on one surface of the display panel; and a circuit board connected to the display panel, wherein the display panel includes a front display portion and a side display portion which are separated by the first curved portion, and wherein the second curved portion includes a pad portion connected to the circuit board.

27 Claims, 6 Drawing Sheets

(56) References Cited

U.S. PATENT DOCUMENTS

| | | | |
|---|---|---|---|
| 9,235,240 B2* | 1/2016 | Pakula | G06F 1/1626 |
| 9,871,898 B2* | 1/2018 | Kwong | H04M 1/0249 |
| 2006/0268528 A1* | 11/2006 | Zadesky | H04M 1/0202 |
| | | | 361/728 |
| 2008/0307840 A1* | 12/2008 | Yu | G06F 1/1601 |
| | | | 70/393 |
| 2009/0009944 A1* | 1/2009 | Yukawa | G06F 1/1605 |
| | | | 361/679.27 |
| 2009/0219684 A1* | 9/2009 | Mori | G06F 1/1626 |
| | | | 361/679.56 |
| 2009/0296325 A1* | 12/2009 | Morimoto | H04M 1/185 |
| | | | 361/679.01 |
| 2010/0061040 A1* | 3/2010 | Dabov | G06F 1/1626 |
| | | | 361/679.01 |
| 2012/0055826 A1* | 3/2012 | Nishimura | B29C 45/14073 |
| | | | 206/320 |
| 2013/0076612 A1* | 3/2013 | Myers | G06F 1/1626 |
| | | | 345/156 |
| 2013/0076649 A1* | 3/2013 | Myers | H04M 1/0268 |
| | | | 345/173 |
| 2013/0300697 A1* | 11/2013 | Kim | G06F 1/1626 |
| | | | 345/173 |
| 2013/0328462 A1* | 12/2013 | Pakula | G06F 1/1626 |
| | | | 312/223.1 |
| 2014/0002973 A1* | 1/2014 | Lee | H05K 7/00 |
| | | | 361/679.01 |
| 2014/0218314 A1 | 8/2014 | Kim et al. | |
| 2014/0307378 A1 | 10/2014 | Kang | |
| 2014/0307396 A1 | 10/2014 | Lee | |

FOREIGN PATENT DOCUMENTS

| | | |
|---|---|---|
| KR | 10-2014-0122597 A | 10/2014 |
| KR | 10-2014-0122875 A | 10/2014 |

* cited by examiner

DISPLAY DEVICE

CROSS-REFERENCE TO RELATED APPLICATION

This application is a continuation of U.S. patent application Ser. No. 14/975,081, filed Dec. 18, 2015, which claims priority to and the benefit of Korean Patent Application No. 10-2015-0048385, filed Apr. 6, 2015, the entire content of both of which is incorporated herein by reference.

BACKGROUND

1. Field

Embodiments of the present invention relate to a display device, and more particularly, to a display device having a curvature.

2. Description of the Related Art

With the development of information technology in society, a high demand for a flat panel display ("FPD") device, used as a connection medium between a user and information, gives rise to a growing market therefor.

Such FPD devices include organic light emitting diode ("OLED") display devices, liquid crystal display ("LCD") devices, electrophoretic display ("EPD") devices, plasma display panel ("PDP") devices, and the like.

Due to the ease of slimming of FPD devices, FPD devices are used in a wide range of applications thereof from household appliances such as televisions ("TV") or video players to portable devices such as laptops or mobile phones.

In order to provide features of flexible display devices or curved display devices from among FPD devices such as OLED display devices, LCD devices, and EPD devices, various studies are being conducted thereon, in addition to the ease of slimming thereof.

A display panel having a flexible display device is manufactured to be foldable or unfoldable whereas a display panel of a curved display device is manufactured to have a curved surface.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY

Aspects of embodiments of the present invention are directed to a display device having a reduced bezel width.

According to an exemplary embodiment of the present invention, a display device includes: a display panel having a first curved portion and a second curved portion; a window on one surface of the display panel; and a circuit board connected to the display panel, wherein the display panel includes a front display portion and a side display portion which are separated by the first curved portion, and wherein the second curved portion includes a pad portion connected to the circuit board.

The circuit board may be on a surface of the second curved portion.

The circuit board may be a flexible printed circuit board.

The display device may further include a printed circuit board connected to the circuit board and on another surface of the display panel.

The display device may further include a printed circuit board on one surface of the circuit board, wherein the circuit board is on another surface of the display panel.

The circuit board may be on an end portion of the window.

A housing having at least an aperture may be on the window, and the side display portion may be exposed through the aperture.

The aperture may include a transparent material through which the side display portion is exposed.

The aperture may include a transparent button member and a biasing member applying a pressure to the transparent button member.

The transparent button member may include a lens.

According to another exemplary embodiment of the present invention, a display device includes: a display panel having a pair of first curved portions and a pair of second curved portions; a window on one surface of the display panel; and a pair of circuit boards connected to the display panel, wherein the display panel includes a front display portion and a pair of side display portions, both of the side display portions being separated from the front display portion by corresponding ones of the first curved portions, and wherein the pair of second curved portions include pad portions connected to respective ones of the circuit boards.

The circuit boards may be on respective ones of surfaces of the pair of second curved portions.

The circuit boards may be flexible printed circuit boards.

The display device may further include a printed circuit board connected to the circuit boards and on the other surface of the display panel.

The display device may further include a printed circuit board on a surface of one of the pair of circuit boards, wherein the circuit boards are on another surface of the display panel.

The circuit boards may be on respective end portions of the window.

A housing having at least an aperture may be on the window, and the side display portion may be exposed through the aperture.

The aperture may include a transparent material through which the side display portion is exposed.

The aperture may include a transparent button member and a biasing member applying a pressure to the transparent button member.

The transparent button member may include a lens.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other features and aspects of the present disclosure of invention will be more clearly understood from the following detailed description taken in conjunction with the accompanying drawings, in which.

DETAILED DESCRIPTION

Figure 1:
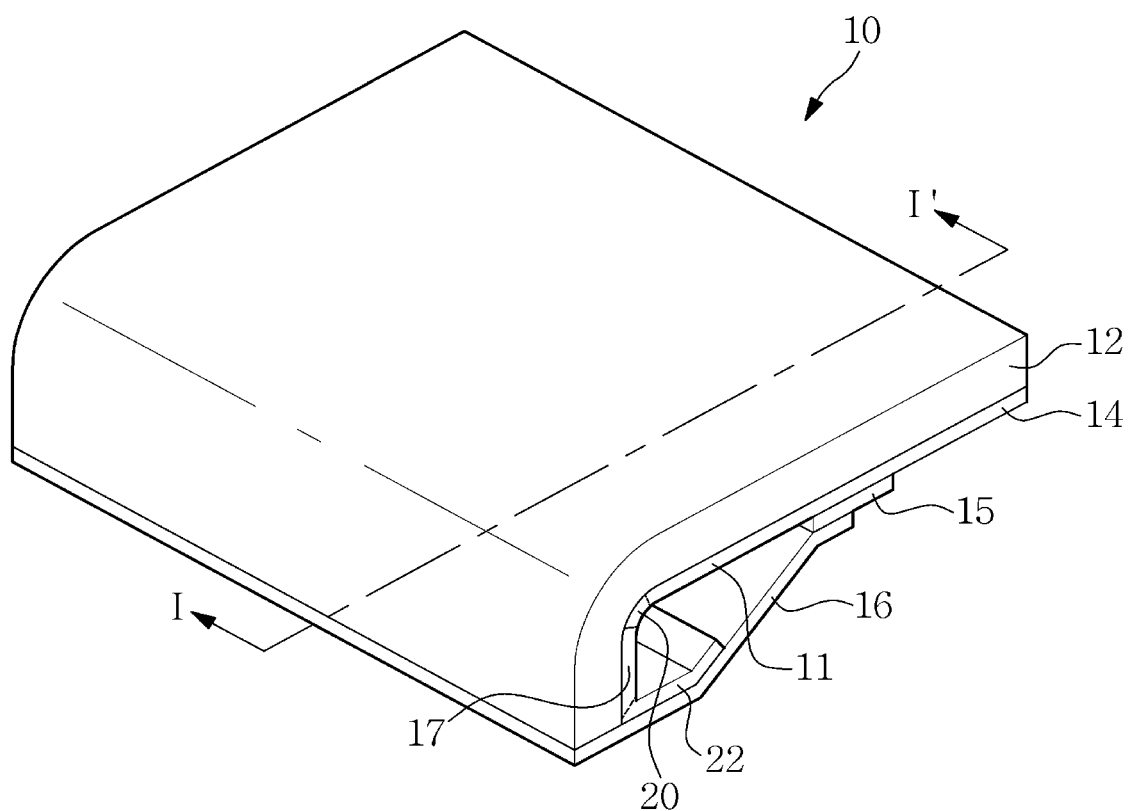
FIG. 1 is a perspective view illustrating a display device according to an exemplary embodiment of the present invention.

Aspects of embodiments of the present invention and methods for achieving them will be made clear from exemplary embodiments described below in detail with reference to the accompanying drawings. Aspects of the present invention may, however, be embodied in many different forms and should not be construed as being limited to the exemplary embodiments set forth herein. Rather, these exemplary embodiments are provided so that this disclosure will be thorough and complete, and will fully convey the scope of the invention to those skilled in the art. Aspects of the present invention are defined by the scope of the claims and equivalents thereof. Therefore, well-known constituent elements, operations and techniques are not described in detail below in order to prevent aspects of the present invention from being obscured. Like reference numerals refer to like elements throughout the specification.

In the drawings, thicknesses of a plurality of layers and areas are illustrated in an enlarged manner for clarity and ease of description thereof. When a layer, area, or plate is referred to as being "on" another layer, area, or plate, it may be directly on the other layer, area, or plate, or intervening layers, areas, or plates may be present therebetween. Conversely, when a layer, area, or plate is referred to as being "directly on" another layer, area, or plate, intervening layers, areas, or plates are absent therebetween. Further when a layer, area, or plate is referred to as being "below" another layer, area, or plate, it may be directly below the other layer, area, or plate, or intervening layers, areas, or plates may be present therebetween. Conversely, when a layer, area, or plate is referred to as being "directly below" another layer, area, or plate, intervening layers, areas, or plates are absent therebetween.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

A flexible display device according to embodiments of the present invention includes a display panel having curved edges. A display device according to an exemplary embodiment will be described based on such a flexible display device; however, the type of the display device is not limited thereto.

A display panel of the flexible display device may be provided on a plurality of surfaces of the flexible display device. For example, a flat portion of the display panel may be provided on a front surface or a rear surface of the flexible display device, and a side portion of the display panel may be provided on a side surface of the flexible display device.

In addition, a curved portion of the display panel may be provided on a curved portion of the flexible display device.

The curved portion of the display panel may be used for a user to view virtual buttons for an output and input of information and to view information therethrough.

Hereinafter, an embodiment with respect to a display device 10 will be described with reference to FIGS. 1, 2A, 2B, and 2C.

Referring to FIGS. 1, 2A, 2B, and 2C, the display device 10 according to one embodiment may include a display panel 14, a window 12 disposed on the display panel 14, and a driving unit connected to the display panel 14.

A description pertaining to the display panel 14 will be provided hereinbelow.

The display panel 14 may be a flexible display panel. Hereinafter, it may be assumed that the display panel 14 is a panel of a flexible organic light emitting diode ("OLED") type display device among various types of flexible display devices. However, the type of the display panel 14 according to embodiments of the present invention is not limited thereto.

The display panel 14 may display an image and may recognize a touch input externally applied thereto. In addition, the display panel 14 may transmit externally incident light, and to this end, components constituting the display panel 14 may all be formed of a transparent material or transparent materials.

The display panel 14 may include a display portion.

The display portion may correspond to a central portion of a front surface of the display panel 14, and may include a plurality of pixels for displaying an image. The plurality of pixels may include a plurality of red pixels displaying (or configured to emit light having) a red color, a plurality of green pixels displaying (or configured to emit light having) a green color, and a plurality of blue pixels displaying (or configured to emit light having) a blue color. Three adjacent pixels having different colors from one another may form a unit pixel for displaying a single unit image. In addition, the display portion may further include at least a touch detection element for recognizing a touch input externally applied thereto. The touch detection element may be formed within the pixel, or may be independently formed in an additional (e.g., separate) touch panel.

Figure 2A:
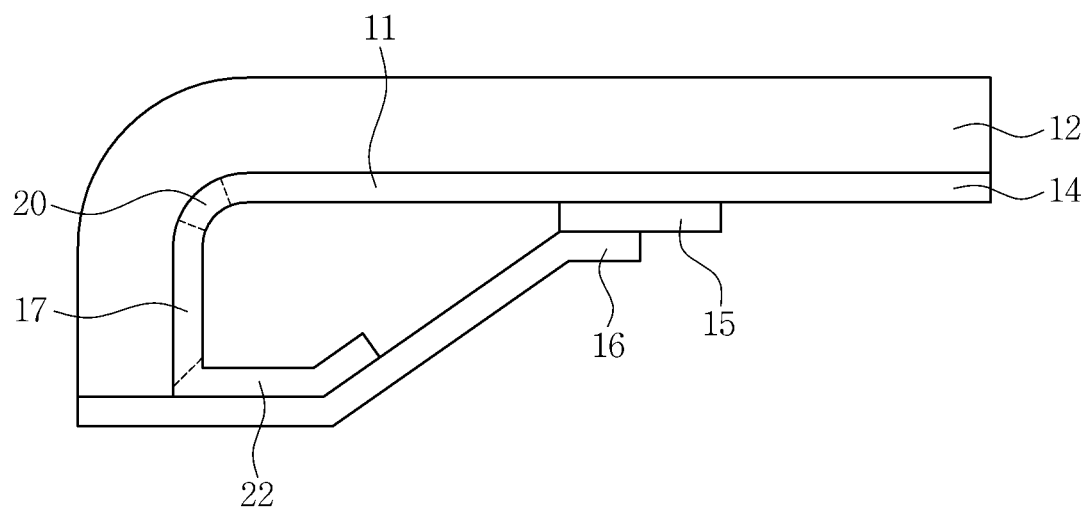
FIGS. 2A, 2B, and 2C are cross-sectional views taken along line I-I' of FIG. 1.
Figure 2B:
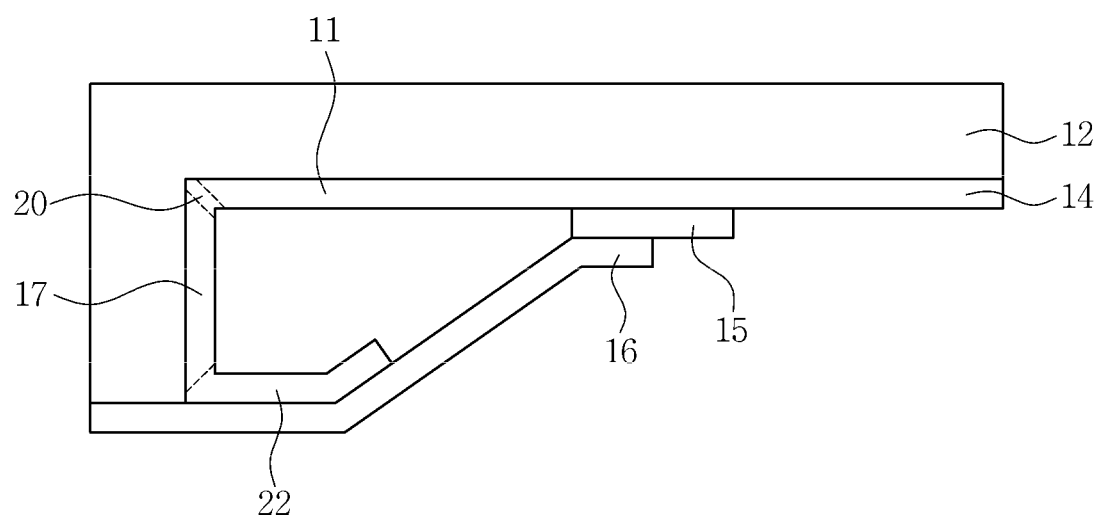

Referring to FIGS. 2A and 2B, the display panel 14 may have a first curved portion 20, and a front display portion 11 and a side display portion 17 which are divided based on (or separated by) the first curved portion 20. The first curved portion 20 may be bent downward to allow the front display portion 11 to be perpendicular to the side display portion 17 as illustrated in FIG. 2B. However, the bent angle of the first curved portion 20 is not limited thereto.

The display panel 14 may have a second curved portion 22 extending from a side of the side display portion 17. The second curved portion 22 may be bent to be perpendicular to the side display portion 17.

The second curved portion 22 may include a pad portion electrically connected to a circuit board 16 of a panel driving unit.

The pad portion may be parallel to the front display portion 11 of the display panel 14 or may be bent toward a lower surface of the display panel 14.

A description pertaining to the window 12 will be provided hereinbelow.

The window 12 may be disposed on the front display portion 11 and the side display portion 17 of the display panel 14, and may be bent to have a shape corresponding to an outer shape of the display panel 14.

The window 12 may be formed of glass (also known as a "display cover glass") or plastic, and may be flexible or rigid. As necessary, inner surfaces of peripheral inactive portions of the window 12 may include an opaque masking layer such as a black ink, a black plastic film, a silver ink, or a silver plastic film, or an opaque masking layer having a different color.

A description pertaining to the panel driving unit will be provided hereinbelow.

The panel driving unit may include the circuit board 16, a printed circuit board (PCB) 15, a driving integrated circuit, and the like.

The circuit board 16 may use a flexible printed circuit board (FPCB), and more particularly, may employ a chip-on-film (COF) scheme. The circuit board 16 may include a driving integrated circuit mounted thereon which supplies a data signal and a gate signal for enabling pixels of the display panel 14 to emit light.

The PCB 15 may supply an image data and a timing synchronization signal to the driving integrated circuit.

In one embodiment, referring to FIG. 2A, one side of the circuit board 16 may be electrically connected to the pad portion and may be bonded to an end portion of the window 12, and the other side of the circuit board 16 may be electrically connected to the PCB 15. The PCB 15 may be interposed between the display panel 14 and the circuit board 16.

Figure 2C:
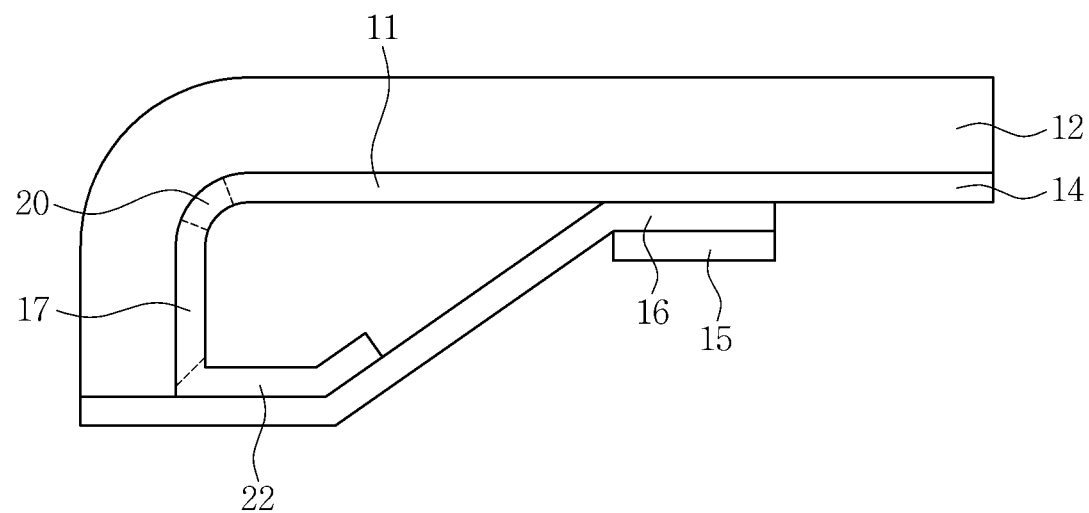

FIG. 2C is a cross-sectional view illustrating another example of a circuit board 16 of the display device according to one embodiment of the present invention.

Referring to FIG. 2C, one side of the circuit board 16 may be electrically connected to the pad portion and may be bonded to the end portion of the window 12, and the other side of the circuit board 16 may be electrically connected to the PCB 15. The PCB 15 may be disposed on a surface of the circuit board 16. The bonding of the circuit board 16 to the end portion of the window 12 may prevent or mitigate the second curved portion 22 from being externally exposed (e.g., from being exposed to the outside environment).

Figure 3:
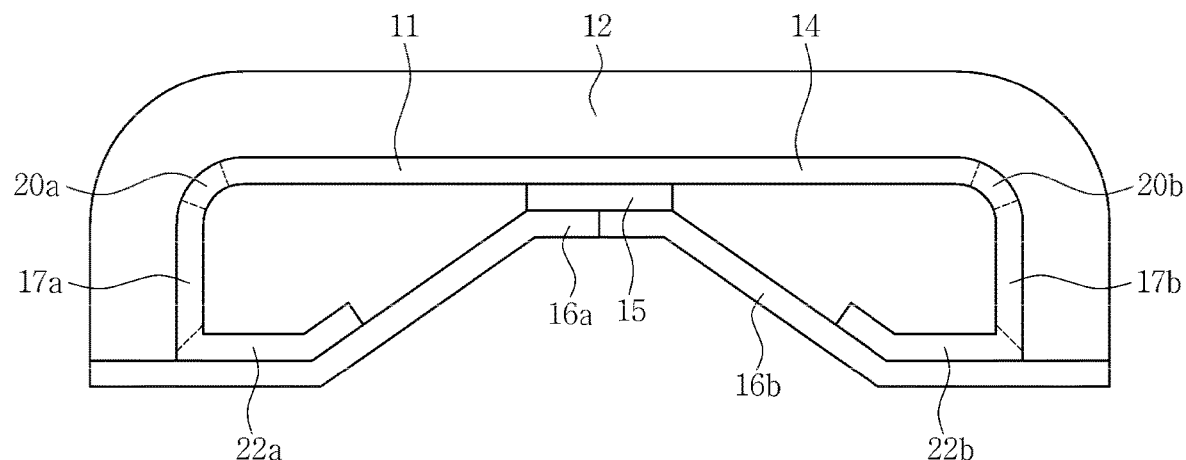
FIG. 3 is a cross-sectional view schematically illustrating a display device according to an embodiment of the present invention.

FIG. 3 is a cross-sectional view schematically illustrating a display device according to one embodiment of the present invention.

Descriptions of components of the display device according to one embodiment that are the same as that of the display device according to a previously embodiment will be omitted herein for conciseness.

Referring to FIG. 3, the display device according to the another exemplary embodiment may include a display panel 14, a window 12 disposed on the display panel 14, a pair of circuit boards 16a and 16b each disposed on a corresponding surface of the display panel 14 and on a corresponding end portion of the window 12, the circuit boards 16a and 16b being connected to one another, and a PCB 15 connected to the circuit boards 16a and 16b and the display panel 14.

The display panel 14 may be symmetrical to one another based on a center thereof, and may have a pair of first curved portions 20a and 20b at which the display panel 14 is bent downwardly from to a front display portion 11. The first curved portions 20a and 20b may be bent to allow the display panel 14 to have a vertically curved shape. The display panel 14 may be divided into portions including the front display portion 11 and a pair of side display portions 17a and 17b, based on (e.g., connected to) the first curved portions 20a and 20b.

Meanwhile, the display panel 14 may have a pair of second curved portions 22a and 22b extending from corresponding ones of the side display portions 17a and 17b, respectively. The second curved portion 22a and 22b may include pad portions electrically connected to the circuit boards 16a and 16b of a panel driving unit. The pad portion may be parallel to the front display portion 11 of the display panel 14 or may be bent toward a lower surface of the display panel 14.

The window 12 may be disposed on the front display portion 11 and the side display portions 17 of the display panel 14, and as illustrated in FIG. 3, may be bent to have a shape corresponding to an outer shape of the display panel 14.

One side of each of the circuit boards 16a and 16b may be electrically connected to the pad portion and may be disposed on the end portion of the window 12, and the other side of each of the circuit boards 16a and 16b may be electrically connected to the PCB 15. The PCB 15 may be interposed between the display panel 14 and the circuit boards 16a and 16b.

Figure 4:
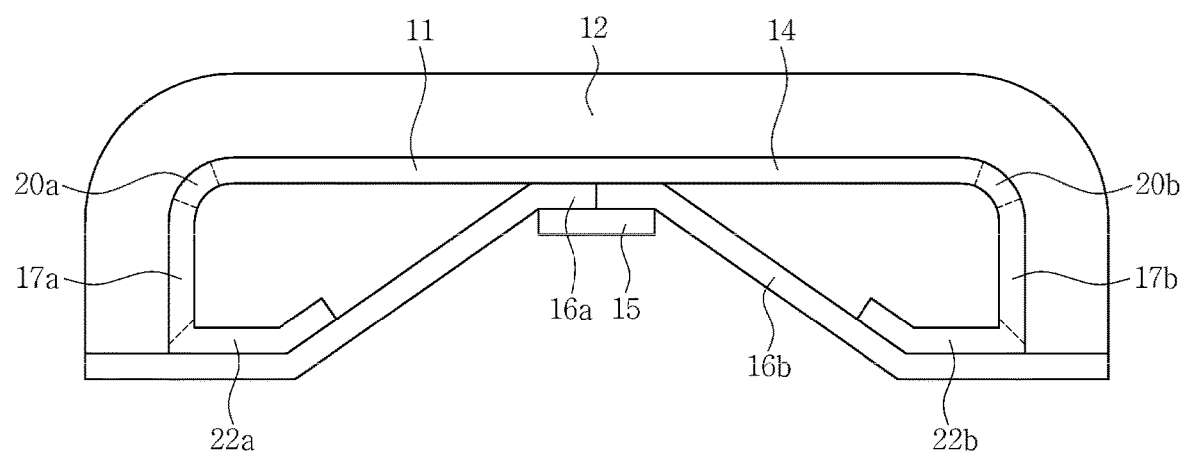
FIG. 4 is a cross-sectional view schematically illustrating a display device according to an embodiment of the present invention.

In still another exemplary embodiment, referring to FIG. 4, one side of each of a pair of circuit boards 16a and 16b may be electrically connected to a pad portion and may be disposed on an end portion of a window 12, and the other side of each of the pair of circuit boards 16a and 16b may be electrically disposed on a lower surface of a display panel 14. A PCB 15 may be disposed on a surface of the circuit boards 16a and 16b.

Hereinafter, a yet another exemplary embodiment with respect to a display device will be described.

Figure 5:
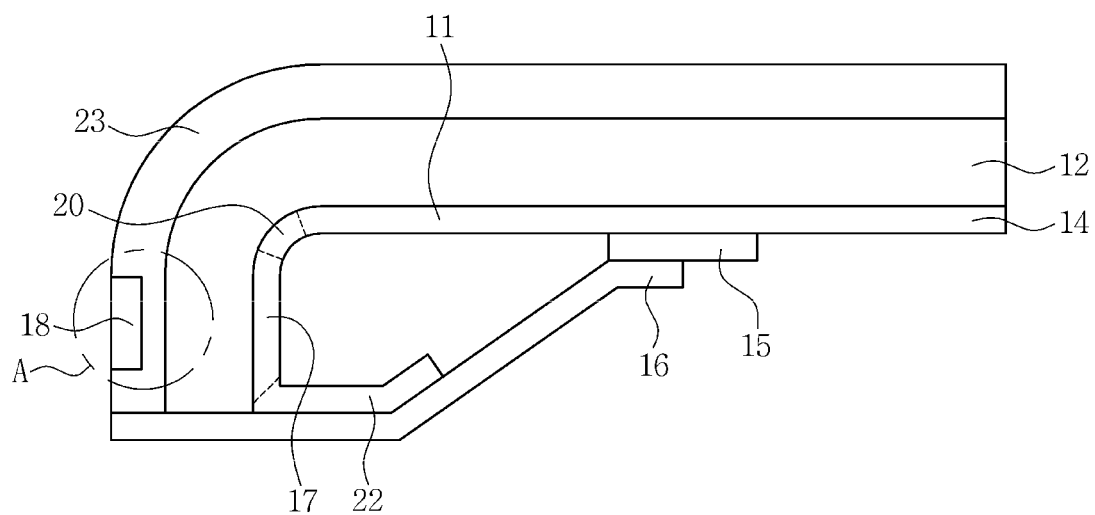
FIG. 5 is a cross-sectional view schematically illustrating a display device according to an embodiment of the present invention.

Referring to FIG. 5, the display device according to the yet another exemplary embodiment may include a housing 23.

The housing 23, also referred to as a case, may be formed of plastic, glass, ceramic, a fiber composite, metal, for example, stainless steel or aluminum (Al), other appropriate materials, or a combination thereof. According to embodiments, a portion of the housing 23 may be formed of a dielectric material or a low-conductivity material. In another embodiment, at least a portion of the housing 23 or at least one component constituting the housing 23 may be formed of metal.

A description pertaining to an aperture 18 will be provided hereinbelow.

The aperture 18 may allow a portion of the display device to be bent such that a user may view the display panel 14 through the aperture 18, and may be provided on a side portion of the housing 23. In FIG. 5, the housing 23 may have a single aperture 18 provided for portions of the display panel 14 including a virtual button, a virtual switch, a scrolling display, and the like. However, the number of the apertures 18 is only given by way of example, and the housing 23 may have one or more apertures, a circular aperture, a linear (e.g., rectangular or having straight edges) aperture, an elliptical aperture, an aperture having a predetermined shape, or the like.

Meanwhile, the aperture 18 may be partially or largely filled with a transparent material. The transparent material may include one of the following materials: plastic, glass, and other appropriate transparent materials. The transparent material may be flexible or rigid. The transparent material may enable portions of the display panel 14 to be accessible through the aperture 18 of the housing 23.

Figure 6A:
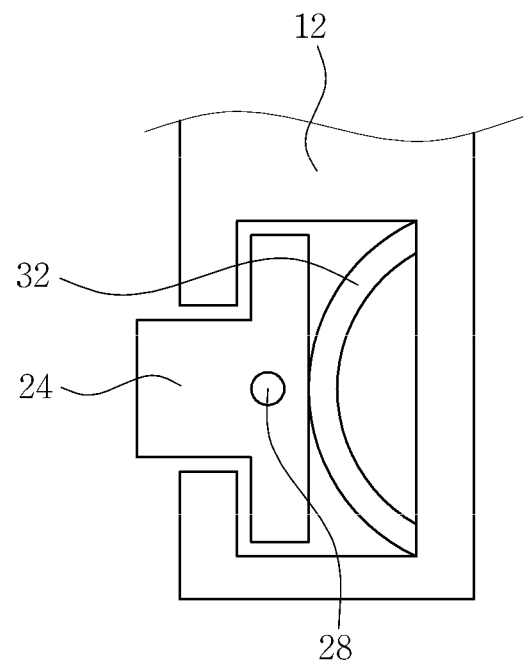
FIGS. 6A and 6B are enlarged views of portion "A" of FIG. 5.

Referring to FIG. 6A, according to one embodiment of the present invention, a transparent button member 24 may be disposed in the aperture 18. The transparent button member 24 may include a conductive material 28, and the conductive material 28 may form a portion of a touch detection circuit that detects a touch input on a button member applied by a user. A position of a biasing member 32 set between the window 12 and the transparent button member 24 is only given by way of example. Because the display panel 14 is flexible, the biasing member 32 may be disposed behind the window 12.

In the configuration in which the biasing member 32 is positioned behind the window 12, the transparent button member 24 may deform the display panel 14, which is flexible, when a user presses down the transparent button member 24. The display panel 14 having the transparent button member 24 may be deformed by applying a pressure on to the biasing member 32. When the pressure applied thereto is released, the biasing member 32 may push the transparent button member 24 away from the display panel 14.

Figure 6B:
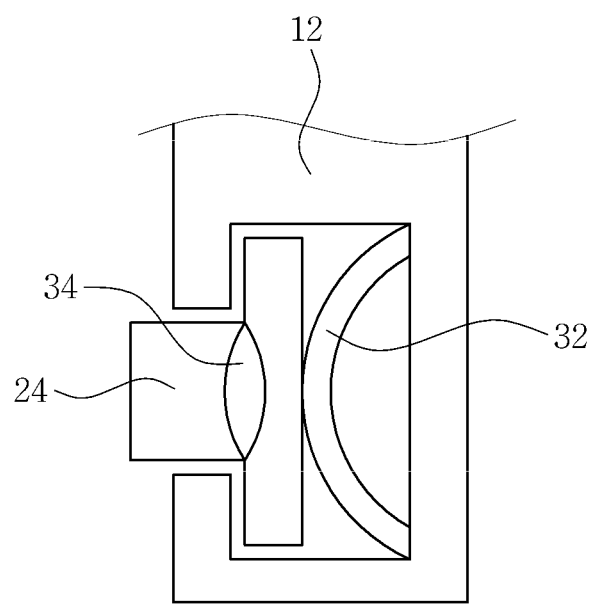

Referring to FIG. 6B, the transparent button member 24 may include a lens 34 for changing a path of light emitted by the display panel 14. For example, the lens 34 may magnify a text or information displayed on the side display portion 17. The lens 34 may be formed of a transparent material such as plastic, glass, or the like.

As set forth above, according to one or more exemplary embodiments, the display portion of the display panel may be disposed to extend on to the end portion of the window of the display device, such that an area of the black matrix may be reduced and the bezel width may be decreased.

From the foregoing, it will be appreciated that various embodiments in accordance with the present disclosure have been described herein for purposes of illustration, and that various modifications may be made without departing from the scope and spirit of the present teachings. Accordingly, the various embodiments disclosed herein are not intended to be limiting of the true scope and spirit of the present teachings. Various features of the above described and other embodiments can be mixed and matched in any manner, to produce further embodiments consistent with the invention.

What is claimed is:

1. A display device comprising:
    a display panel comprising:
        a front display portion and a side display portion, the front display portion and the side display portion being configured to emit light for displaying an image;
        a curved display portion between the front display portion and the side display portion; and
        a pad portion bent at an edge of the side display portion and facing the front display portion;
    a window on one surface of the display panel, the window comprising:
        a front portion on the front display portion;
        a side portion on the side display portion; and
        a curved portion between the front portion and the side portion; and
    a circuit board connected to the pad portion of the display panel.

2. The display device of claim 1, wherein the circuit board is on a surface of the pad portion.

3. The display device of claim 1, wherein the pad portion is between the front display portion and the circuit board.

4. The display device of claim 1, further comprising a printed circuit board connected to the circuit board and on another surface of the display panel.

5. The display device of claim 1, further comprising a printed circuit board on one surface of the circuit board,
    wherein the circuit board is on another surface of the display panel.

6. The display device of claim 1,
    wherein the circuit board directly contacts an end portion of the window.

7. The display device of claim 1, wherein a housing on the window has at least an aperture, and
    the side display portion is exposed through the aperture.

8. The display device of claim 7, further comprising a transparent material in the aperture.

9. The display device of claim 7, further comprising a transparent button member and a biasing member to apply a pressure to the transparent button member and located in the aperture.

10. The display device of claim 9, wherein the transparent button member comprises a lens.

11. A display device comprising:
    a display panel comprising:
        a front display portion and a pair of side display portions, the front display portion and the side display portions being configured to emit light to display an image;
        a pair of curved display portions, each located between the front display portion and a corresponding one of the pair of side display portions; and
        a pair of pad portions bent at each edge of the pair of side display portions, respectively, and facing the front display portion;
    a window on one surface of the display panel, the window comprising:
        a front portion on the front display portion;
        a pair of side portions on the pair of side display portions, respectively; and
        a pair of curved portions, each located between the front portion and a corresponding one of the pair of side portions; and
    a pair of circuit boards connected to respective ones of the pad portions of the display panel.

12. The display device of claim 11, wherein the circuit boards are on respective ones of surfaces of the pair of pad portions.

13. The display device of claim 11, wherein each of the pair of pad portions is disposed between the front display portion and a corresponding one of the circuit boards.

14. The display device of claim 11, further comprising a printed circuit board connected to the circuit boards and on another surface of the display panel.

15. The display device of claim 11, further comprising a printed circuit board on a surface of one of the pair of circuit boards,
wherein the circuit boards are on another surface of the display panel.

16. The display device of claim 11,
wherein the circuit boards directly contact respective end portions of the window.

17. The display device of claim 11, wherein a housing on the window has at least an aperture, and
the side display portion is exposed through the aperture.

18. The display device of claim 17, further comprising a transparent material located in the aperture.

19. The display device of claim 17, further comprising a transparent button member and a biasing member to apply a pressure to the transparent button member and located in the aperture.

20. The display device of claim 19, wherein the transparent button member comprises a lens.

21. A display device comprising:
a display panel comprising:
a front display portion and a side display portion, the front display portion and the side display portion comprising a plurality of pixels for displaying an image;
a curved display portion between the front display portion and the side display portion; and
a pad portion bent at an edge of the side display portion and facing the front display portion;
a window on one surface of the display panel, the window comprising:
a front portion on the front display portion;
a side portion on the side display portion; and
a curved portion between the front portion and the side portion; and
a circuit board connected to the pad portion of the display panel.

22. The display device of claim 1, wherein the circuit board has a slope portion.

23. The display device of claim 22, wherein the slope portion of the circuit board is inclined upward from an end of the circuit board that is connected to the pad portion.

24. The display device of claim 11, wherein each of the circuit boards has a slope portion.

25. The display device of claim 24, wherein the slope portion of the circuit boards is inclined upward from an end of a corresponding one of the circuit boards that is connected to a corresponding one of the pad portions.

26. The display device of claim 21, wherein the circuit board has a slope portion.

27. The display device of claim 26, wherein the slope portion of the circuit board is inclined upward from an end of the circuit board that is connected to the pad portion.

* * * * *